United States Patent

[11] 3,530,911

| [72] | Inventor | Cyrus E. Hoadley |
| | | Olla, Louisiana |
| [21] | Appl. No. | 739,865 |
| [22] | Filed | June 25, 1968 |
| [45] | Patented | Sept. 29, 1970 |
| [73] | Assignee | The Youngstown Sheet and Tube Company |
| | | Youngstown, Ohio |

[54] MOUNTING FOR SHEAR
10 Claims, 5 Drawing Figs.

[52] U.S. Cl. .................................................. 144/34
[51] Int. Cl. ...................................................... A01g 23/02
[50] Field of Search ............................................ 144/2—21,
3—4, 34, 34—(1—6), 309—34

[56] References Cited
UNITED STATES PATENTS

| 2,697,459 | 12/1954 | McFaull ...................... | 144/34 |
| 3,196,911 | 7/1965 | Busch et al. ................. | 144/34 |
| 3,230,988 | 1/1966 | Dixon ........................... | 144/34 |
| 3,270,787 | 9/1966 | Rehnstrom ................... | 144/34 |

Primary Examiner—Gerald A. Dost
Attorneys—J. Vincent Martin, Joe E. Edwards and M. H. Gay ABSTRACT: This patent discloses a tree harvester, and more particularly a shear for the tree harvester mounted in a manner to reduce stresses on various portions of the shear. The mounting disclosed is of a nature to permit the entire shear to move to conform to the position of the tree therein.

Patented Sept. 29, 1970
3,530,911
Sheet 1 of 2
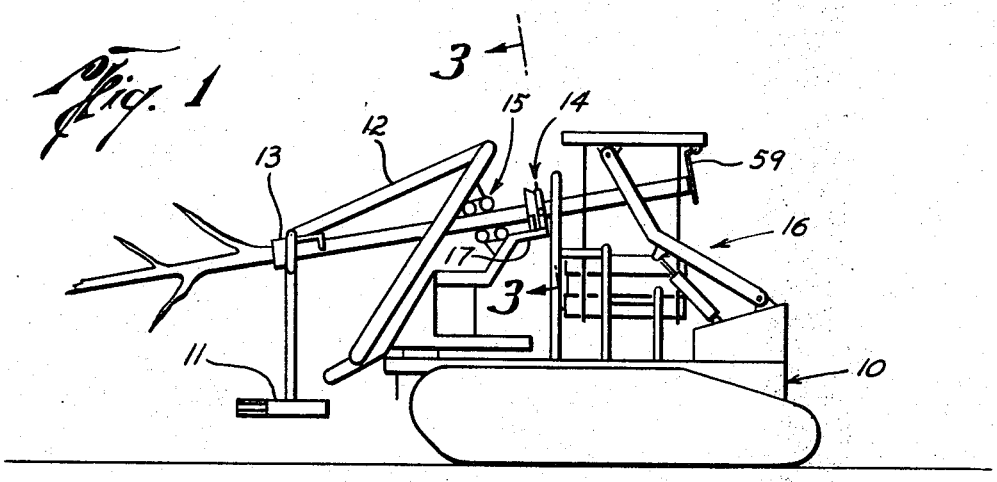
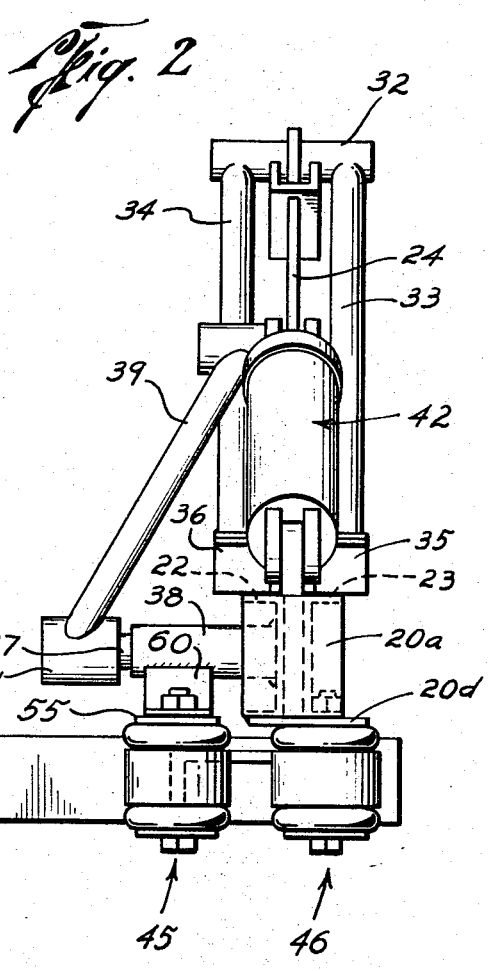
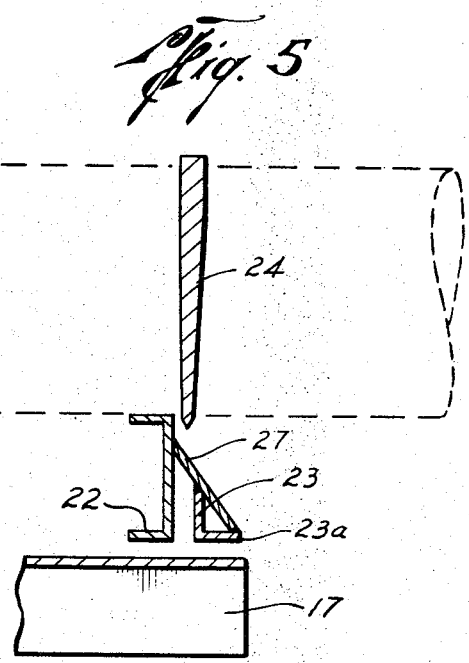
Cyrus E. Hoadley
INVENTOR.
BY
ATTORNEYS

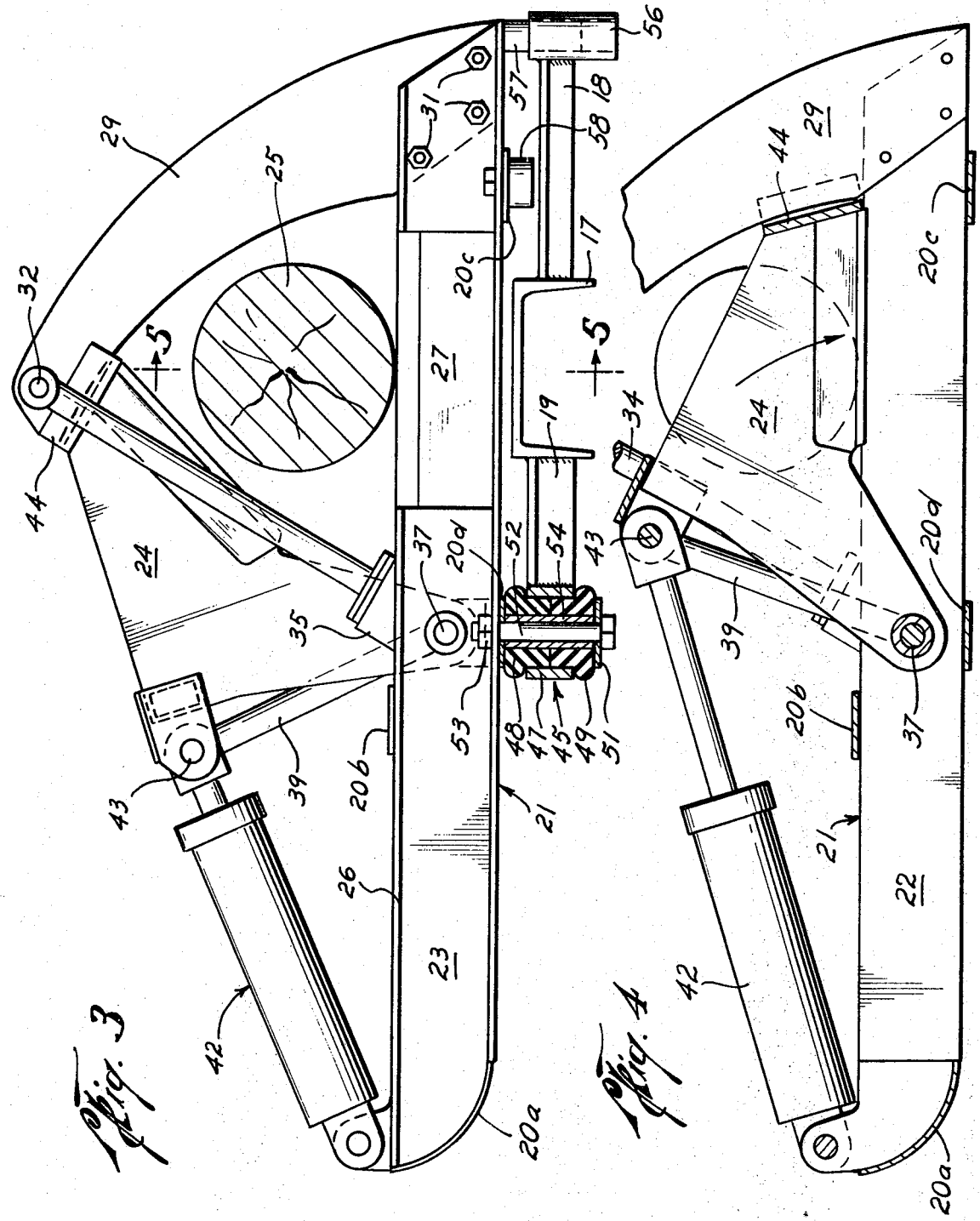

2

MOUNTING FOR SHEAR

This invention relates to a tree harvester, and to a shear for a tree harvester.

Tree-harvesting machines commonly employ buck shears to shear the tree into sections. The sections may or may not be dropped into a receptacle on the machine. As the tree is not uniform in size or shape, it is difficult to position the tree in contact with the anvil before the shear is operated. Thus, substantial stresses may be imposed on the shear which may result in damage.

The shear blade has a beveled cutting edge which, in passing through a tree, tends to tilt the buck shear. If the mounting is such that it is held against tilting, stresses are imposed on the shear due to this tilting action.

It is an object of this invention to provide a buck shear with a mounting which will permit the shear to conform to a tree and to reduce stresses on the shear.

Another object is to provide for mounting of a buck shear which permits the anvil to move into engagement with a tree upon initial actuation of the shear to reduce stresses on the shear.

Another object is to provide for pivotal mounting of a buck shear in the plane of the shear blade to permit the anvil to move into engagement with a tree upon initial actuation of the shear to reduce stresses on the shear.

Another object is to provide for pivotal mounting of a buck shear in the plane of the shear blade to permit the anvil to move into engagement with the tree upon initial actuation of the shear and to provide for limited movement of the shear in any direction to reduce stresses on the shear.

Another object is to brace a shear blade in such a manner as to permit a reduction in the need for blade guides.

Other objects, features and advantages of this invention will be apparent from the drawings, the specification and the claims.

In the drawings, wherein an illustrative embodiment of this invention is shown, and wherein like numerals indicate like parts;

FIG. 1 is a diagrammatic view in side elevation of a tree harvester constructed in accordance with this invention;

FIG. 2 is a view in side elevation of a buck shear and its mounting in accordance with this invention;

FIG. 3 is a view along the line 3–3 of FIG. 1;

FIG. 4 is a view similar to FIG. 3 with the near channel of the anvil removed;

FIG. 5 is a view along the line 5–5 of FIG. 3.

The tree harvester illustrated in FIG. 1 includes a mobile base 10 having a fell shear 11 carried on an articulating boom 12. A grasping means 13 on the boom manipulates the tree into the position shown in FIG. 1 where it is moved through the buck shear indicated generally at 14 by the endless track assembly indicated generally at 15. As the tree is severed into sections, it is caught in the catcher indicated generally at 16.

The base includes a shear support on which the buck shear may be mounted. The shear support includes the downwardly facing channel 17 and a pair of angle iron members 18 and 19 extending therefrom in opposite directions. The support could take any desired form which would provide a structural base for the buck shear.

The buck shear includes an elongate anvil indicated generally at 21. The anvil is made from a pair of parallel channel sections 22 and 23. The channels are arranged by suitable straps 20a, 20b, 20c and 20d with their webs confronting each other and providing a slight space therebetween to permit movement of the blade 24 between the two channel sections.

By reference to FIGS. 3 and 5, it will be noted that the channel 23, in the area engaged by a tree 25 being cut, is formed to permit the tree to readily fall into the catcher 16. The upper flange 26 of channel 23 is cut away at this point and a plate 27 is secured as by welding to the web of channel 23 at its uppermost point and to the lower flange 23a.

A curved guide 29 is carried by the anvil. The guide is secured at its lower end to the anvil by the several bolts and nuts 31. A crossbar 32 extends through the upper end of the curve guide and is secured through supports 33 and 34 to anvil 21 through suitable support blocks 35 and 36, respectively. The above-described structure holds the guide plate 29 substantially rigid relative to the anvil 21.

The blade 24 is mounted for swinging movement about the shaft 37 which extends through the anvil 21. The shaft 37 extends outwardly of the anvil from the channel 22 and is supported in a pipe or similar structure 38 which is attached to the channel 22 as by welding.

An arm 39 is journaled about the shaft 37 by a bearing 41 on the end of the shaft at a point remote from the blade 24. The other end of the arm is secured to the blade at a point remote from the shaft to provide lateral support for the blade. In the illustrated form the blade is actuated by a cylinder and piston hydraulic motor illustrated generally at 42, and the arm 39 is secured to the pivot pin 43 which connects the hydraulic motor 42 to the blade 24. Thus, as the blade is swung about its pivot 37, the arm 39 rotates about the same center as the blade and provides lateral support therefor.

The blade carries a U-shaped guide block 44 which cooperates with the curved guide 29 to further support the blade.

In accordance with this invention, the buck shear has its anvil secured to the support in a manner providing for pivotal movement of the shear in the plane of the blade about a pivot which is positioned lengthwise of the anvil from the area of the anvil which engages a tree during operation of the shear. Preferably, this pivotal mounting is also one which permits limited movement in any direction. Preferably, the mounting includes resilient mountings indicated generally at 45 and 46. It will be noted that these mounts are spaced a considerable distance from the plate 27 which generally defines the area of the anvil which is engaged by a tree during the cut. Thus, if the tree does not engage the anvil at the beginning of the cut, the anvil is free to move upwardly upon actuation of the hydraulic motor 42 to engage the tree. This will reduce the stresses placed on the shear during its operation.

While the pivotal mounting may take any desired form, in the illustrated embodiment the two mountings 45 and 46 are identical and include a sleeve 47 secured to the angle support 19. Within the sleeve 47 is positioned a spool-like resilient member made up of upper and lower identical sections 48 and 49. A washer 51 is provided below the spool. A bolt 52 extends through the spool and has a suitable nut 53 thereon. The plate 20d provides a washer above the resilient member 48 in mounting 46. A separate washer 55 is provided below the mounting block 60 carried on sleeve 38 in the case of mounting 45. A spool 54 surrounds bolt 52. Thus, when the nut 53 is run up tight the spool is confined between the plate 20d and the washer 51 and compression of resilient members 48 and 49 is limited to a desirable amount. The arrangement is such that limited freedom of movement is provided in all directions and a substantial freedom of movement is provided in the plane of the blade 24. The double pivotal mounting 45 and 46 gives stability to the mounting in a plane perpendicular to the plane of the blade 24 while permitting substantial pivoting movement in the plane of the blade 24.

Preferably, the mounting for the shear includes means spaced from the supports 45 and 46 for guiding the shear in its pivotal movement. This guide may take any desired form. In the illustrated embodiment a tubular member, such as a pipe 56, is carried on the angle member 18 and a cylindrical pin 57 is carried on one end of the anvil and loosely telescopes within the pipe 56.

While a cut is being made, the anvil will normally move upwardly relative to the support for the shear. When the cut is finished, gravity and the resilient pivotal supports 45 and 46 will tend to move the anvil back to its "at rest" position. A suitable rubber bumper indicated generally at 58 is carried by the anvil and engages the upper leg of the angle member 18 to prevent the anvil from striking the support other than through the bumper.

For a complete discussion of the operation of the overall tree harvester shown in FIG. 1, reference is made to copending application Ser. No. 739,766 filed June 25, 1968. In general the machine is positioned so that the grasping means 13 surrounds a tree and the fell shear 11 is operated to sever the tree at approximately ground level. The tree is rotated into the substantially horizontal position shown and the boom 12 is retracted to position the tree in the endless chain system 45 which moves it through the buck shear 14. As the tree strikes the flag 59, it stops the movement of the tree through the buck shear and actuates the buck shear to sever a section of tree which falls into the catcher section 16. As the buck shear is actuated, the anvil and blade both move toward the tree to engage the tree on opposite sides before the cut is begun. If the tree does not lie against the anvil 21, the resilient mountings 45 and 46 will permit the shear to pivot until the anvil engages the tree. Any stresses which are set up during the cut which tend to move the buck shear relative to the base 10 are absorbed in the resilient mountings 45 and 46. The amount of movement of the anvil in the plane of the blade 24 may be substantial when the log 25 is so shaped as to be positioned away from the anvil before the cut is begun. The limited movement of the anvil in all directions permitted by the mountings 45 and 46 permit the shear to tilt to avoid stresses in the mounting and shear.

While the disclosure has been directed to a buck shear, it will be appreciated that the invention may be used in any desired situation to reduce stresses on a shear.

The foregoing disclosure and description of the invention are illustrative and explanatory thereof and various changes in the size, shape and materials, as well as in the details of the illustrated construction, may be made within the scope of the appended claims without departing from the spirit of the invention.

I claim:

1. A tree harvester comprising:
   a base having a shear support thereon;
   a buck shear having an elongate anvil and a blade carried by the anvil;
   means for securing the anvil to the support and providing for pivotal movement of the shear in the plane of the blade about a pivot positioned lengthwise of said anvil from the area thereof which engages a tree during operation of the shear;
   whereby the shear may pivot through a substantial arc to permit the shear to conform to a tree positioned in the shear;
   means on said base for supporting a tree in a position to be passed through the shear; and
   means for feeding a tree through the shear.

2. The tree harvester of claim 1 wherein the securing means includes a resilient member permitting limited movement in any direction including said pivotal movement.

3. The tree harvester of claim 1 wherein the securing means includes pivot means and guide means spaced therefrom for guiding the shear in its pivotal movement.

4. The tree harvester of claim 1 wherein the securing means includes a resilient member permitting limited movement in any direction including said pivotal movement and guide means spaced therefrom for guiding the shear in its pivotal movement.

5. The tree harvester of claim 1 including a shaft about which the blade is pivoted and an arm journaled about said shaft at a point remote from said blade and secured to said blade at a point remote from the shaft to give lateral support to said blade.

6. Apparatus comprising:
   a shear support;
   a shear having an elongate anvil and a blade carried by the anvil; and
   means for securing the anvil to the support and providing for pivotal movement of the shear in the plane of the blade about a pivot positioned lengthwise of said anvil from the area thereof which engages a tree during operation of the shear;
   whereby the shear may pivot through a substantial arc to permit the shear to conform to a tree positioned in the shear.

7. The apparatus of claim 6 wherein the securing means includes a resilient member permitting limited movement in any direction including said pivotal movement.

8. The apparatus of claim 6 wherein the securing means includes pivot means and guide means spaced therefrom for guiding the shear in its pivotal movement.

9. The apparatus of claim 6 wherein the securing means includes a resilient member permitting limited movement in any direction including said pivotal movement and guide means spaced therefrom for guiding the shear in its pivotal movement.

10. The apparatus of claim 6 including a shaft about which the blade is pivoted and an arm journaled about said shaft at a point remote from said blade and secured to said blade at a point remote from the shaft to give lateral support to said blade.